(12) United States Patent
Kwon et al.

(10) Patent No.: US 12,465,340 B2
(45) Date of Patent: Nov. 11, 2025

(54) ASYMMETRIC ROLLING JOINT DEVICE OF SURGICAL INSTRUMENT

(71) Applicants: ROEN SURGICAL, INC., Daejeon (KR); KAIST, Daejeon (KR)

(72) Inventors: Dong-Soo Kwon, Daejeon (KR); Jeong-Do Ahn, Daejeon (KR); Joon-Hwan Kim, Daejeon (KR); Jae-Min You, Daejeon (KR); Han-Soul Kim, Daejeon (KR); Dong-Geol Lee, Daejeon (KR); Ye-sung Yi, Daejeon (KR); Dong-Hoon Baek, Daejeon (KR)

(73) Assignees: ROEN SURGICAL, INC., Daejeon (KR); KAIST, Daejeon (KR)

( * ) Notice: Subject to any disclaimer, the term of this patent is extended or adjusted under 35 U.S.C. 154(b) by 867 days.

(21) Appl. No.: 17/406,834

(22) Filed: Aug. 19, 2021

(65) Prior Publication Data

US 2022/0313231 A1 Oct. 6, 2022

(30) Foreign Application Priority Data

Apr. 5, 2021 (KR) .................... 10-2021-0044885

(51) Int. Cl.
*A61B 17/00* (2006.01)
*F16C 11/04* (2006.01)

(52) U.S. Cl.
CPC ........ *A61B 17/00234* (2013.01); *F16C 11/04* (2013.01); *A61B 2017/00314* (2013.01); *A61B 2017/00323* (2013.01)

(58) Field of Classification Search
CPC .... A61B 17/00234; A61B 2017/00314; A61B 2017/00323
See application file for complete search history.

(56) References Cited

U.S. PATENT DOCUMENTS

| 5,772,578 | A | 6/1998 | Heimberger et al. |
| 8,708,953 | B2 | 4/2014 | Salahieh et al. |
| 2005/0010220 | A1* | 1/2005 | Casutt ................ A61B 17/7082 606/86 A |
| 2008/0249364 | A1 | 10/2008 | Korner |
| 2014/0058364 | A1* | 2/2014 | Donhowe .............. A61B 34/30 606/1 |

(Continued)

FOREIGN PATENT DOCUMENTS

| KR | 20130132233 A | * 12/2013 | ....... A61B 17/00234 |
| KR | 10-1909041 B1 | 10/2018 | |

(Continued)

*Primary Examiner* — William J Levicky
*Assistant Examiner* — Laura Hodge
(74) *Attorney, Agent, or Firm* — STIP Law Group, LLC

(57) ABSTRACT

Disclosed herein is an asymmetric rolling joint device of a surgical instrument which increases traction force by asymmetrically forming rolling contact surfaces of joint links facing each other. The asymmetric rolling joint device includes: a first joint link part which forms a joint of the surgical instrument; and a second joint link part coming into rolling contact with the first joint link part, wherein rolling contact surfaces where the first joint link part and the second joint link part come into rolling contact with each other are formed asymmetrically so as to increase traction force more than rolling contact surfaces which are formed symmetrically.

15 Claims, 9 Drawing Sheets

(56) References Cited

U.S. PATENT DOCUMENTS

| | | | |
|---|---|---|---|
| 2015/0047451 A1* | 2/2015 | Kwon | A61B 17/29 74/490.05 |
| 2016/0213227 A1 | 7/2016 | Osaki et al. | |
| 2016/0302812 A1 | 10/2016 | Monroe et al. | |
| 2018/0125596 A1 | 5/2018 | He et al. | |
| 2018/0250053 A1 | 9/2018 | Schultz | |
| 2022/0280253 A1* | 9/2022 | He | A61B 34/71 |
| 2023/0380918 A1* | 11/2023 | Wang | A61B 34/71 |

FOREIGN PATENT DOCUMENTS

| | | | | |
|---|---|---|---|---|
| KR | 20210048171 A | * | 5/2021 | A61B 17/00234 |
| WO | WO2013039999 A3 | | 3/2013 | |
| WO | WO2016123139 A2 | | 8/2016 | |
| WO | WO-2021135786 A1 | * | 7/2021 | A61B 17/00 |

* cited by examiner

ASYMMETRIC ROLLING JOINT DEVICE OF SURGICAL INSTRUMENT

CROSS-REFERENCE TO RELATED APPLICATIONS

This application claims priority to and the benefit of Korean patent application No. 10-2021-0044885 filed on Apr. 5, 2021, the disclosure of which is incorporated herein by reference in its entirety.

BACKGROUND OF THE INVENTION

Field of the Invention

The present invention relates to an asymmetric rolling joint device of a surgical instrument, and more particularly, to an asymmetric rolling joint device of a surgical instrument which increases traction force by asymmetrically forming rolling contact surfaces of joint links facing each other.

Background Art

A small and flexible multi-degree of freedom surgical instrument is required in order to drag, suture and resect tissues in narrow and curved organs of a human body. If a diameter of the surgical instrument gets smaller in order to manufacture a flexible multi-degree of freedom surgical instrument, since a diameter of a driving wire to drive a joint also gets smaller, the surgical instrument is reduced in traction force relative to the degree of freedom.

In general, in case of an actual surgery, as shown in FIG. 2, the surgical instrument requires large traction force in the first direction of the surgical instrument. However, traction force in the second direction, which is in the opposite direction to the first direction, is relatively smaller than that of the first direction. Therefore, the surgical instrument does not require large traction force in all directions, but the direction which requires relatively larger traction force may be varied or fixed according to a purpose of surgery.

As described above, a joint of a surgical instrument suitable for the direction requiring relatively larger traction force must be manufactured, but the conventional symmetric joint illustrated in FIG. 1 cannot solve the above problem.

PATENT LITERATURE

Patent Documents

Patent Document 0001: Korean Patent No. 10-1909041

SUMMARY OF THE INVENTION

Accordingly, the present invention has been made to solve the above-mentioned problems occurring in the prior arts, and it is an object of the present invention to provide an asymmetric rolling joint device of a surgical instrument that can increase traction force in a desired direction by asymmetrically designing a rolling joint, which typically has a symmetric shape, used for the existing flexible joint.

However, objects of the present invention are not limited to the objects described above, and other objects that are not described will be clearly understood by a person skilled in the art from the description below.

To accomplish the above object, according to the present invention, there is provided an asymmetric rolling joint device of a surgical instrument including: a first joint link part which forms a joint of the surgical instrument; and a second joint link part coming into rolling contact with the first joint link part, wherein rolling contact surfaces where the first joint link part and the second joint link part come into rolling contact with each other are formed asymmetrically so as to increase traction force more than rolling contact surfaces which are formed symmetrically.

Moreover, the driving wire holes formed on the rolling surfaces have different heights in order to increase traction force together with the asymmetric rolling surfaces.

Furthermore, each of the joint link parts includes: a first rolling surface formed at one side on the basis of a virtual central line of the joint link part; a second rolling surface formed at the other side on the basis of the virtual central line; and first and second driving wire holes disposed at both sides so that driving wires penetrate therethrough.

Additionally, the radius of the first rolling surface is larger than the radius of the second rolling surface, so that the rolling surfaces are formed asymmetrically.

In addition, a circle formed on the basis of the radius of the second rolling surface is inscribed in a circle formed on the basis of the radius of the first rolling surface.

Moreover, a height of the first driving wire hole is relatively lower than a height of the second driving wire hole, so that the rolling surfaces are formed asymmetrically.

Furthermore, each of the joint link parts includes: a first rolling surface formed at one side on the basis of a virtual central line of the joint link part; a second rolling surface formed at the other side on the basis of the virtual central line; and first and second driving wire holes disposed at both sides so that driving wires penetrate therethrough, and the rolling contact surfaces are formed asymmetrically by the first and second rolling surfaces.

Additionally, as a first preferred embodiment, a radius of the first rolling surface and a radius of the second rolling surface have different values so that the rolling contact surfaces are formed asymmetrically.

In addition, the radius of the first rolling surface is larger than the radius of the second rolling surface, so that the rolling surfaces are formed asymmetrically.

Moreover, a circle formed on the basis of the radius of the second rolling surface is inscribed in a circle formed on the basis of the radius of the first rolling surface.

Furthermore, the first and second driving wire holes are respectively formed on the first and second rolling surfaces, and a height of the first driving wire hole is relatively lower than a height of the second driving wire hole, so that the rolling surfaces are formed asymmetrically.

Additionally, as a second preferred embodiment, the first rolling surface includes a circular segment having a first radius and a first tangent line meeting the circular segment having the first radius, the second rolling surface includes a circular segment having a second radius and a second tangent line meeting the circular segment having the second radius, and the first radius and the second radius have different values, so that rolling contact surfaces are formed asymmetrically.

In addition, the first radius is relatively larger than the second radius, and a slope of the second tangent line is relatively larger than that of the first tangent line, so that rolling surfaces are formed asymmetrically.

Moreover, the first and second driving wire holes are respectively formed on the first and second tangent lines, and the height of the first driving wire hole is relatively lower than that of the second driving wire hole, so that the rolling surfaces are formed asymmetrically.

Furthermore, as a third preferred embodiment, the first rolling surface includes a circular segment having a first radius and a first tangent line meeting the circular segment having the first radius, the second rolling surface includes a circular segment having a second radius, and the first radius and the second radius have different values, so that rolling contact surfaces are formed asymmetrically.

Additionally, the first driving wire hole is formed on the tangent line meeting the circular segment having the first radius, the second driving wire hole is formed on the circular segment having the second radius, and the height of the first driving wire hole is relatively lower than that of the second driving wire hole, so that the rolling surfaces are formed asymmetrically.

In addition, as a fourth preferred embodiment, the first rolling surface includes a circular segment having a first radius, the second rolling surface includes a circular segment having a second radius and a tangent line meeting the circular segment having the second radius, and the first radius and the second radius have different values, so that rolling contact surfaces are formed asymmetrically.

Furthermore, the first radius is relatively larger than the second radius, so that the rolling surfaces are formed asymmetrically.

Moreover, the first driving wire hole is formed on the circular segment having the first radius, the second driving wire hole is formed on the tangent line meeting the circular segment having the second radius, and the height of the first driving wire hole is relatively larger than that of the second driving wire hole, so that the rolling surfaces are formed asymmetrically.

Meanwhile, a circle formed on the basis of the second radius is inscribed in a circle formed on the basis of the first radius.

According to the present invention, the asymmetric rolling joint device of a surgical instrument can increase traction force in a desired direction by asymmetrically designing the rolling joint, which typically has a symmetric shape, used for the existing flexible joint.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 5A-5B shows that traction force increases relatively wherein FIG. 5A shows that an Ra value increases (3.5→4.5) and FIG. 5B shows that an Rb value decreases (2.5→1.5);

DETAILED DESCRIPTION OF THE PREFERRED EMBODIMENT

Hereinafter, preferred embodiments of the present invention will be described in detail with reference to the accompanying drawings. Moreover, the embodiments described hereinafter will not unfairly limit the contents of the present invention described in claims, and all components described in the embodiments of the present invention are not essential as means for solving problems. Furthermore, descriptions of conventional arts and matters that are obvious to those skilled in the art will be omitted, and explanation or description of such omitted components (methods) and functions may be sufficiently referred without departing from the technical scope and idea of the present invention.

As shown in FIGS. 2 to 4A-4C, an asymmetric rolling joint device of a surgical instrument according to a preferred embodiment of the present invention includes a multi-flexible joint part 102 having joint links. The multi-flexible joint part 102 has a plurality of the joint links which are connected with one another and is manipulated by a driving wire so that a user can operate in multidirectional degree of freedom.

Figure 1:
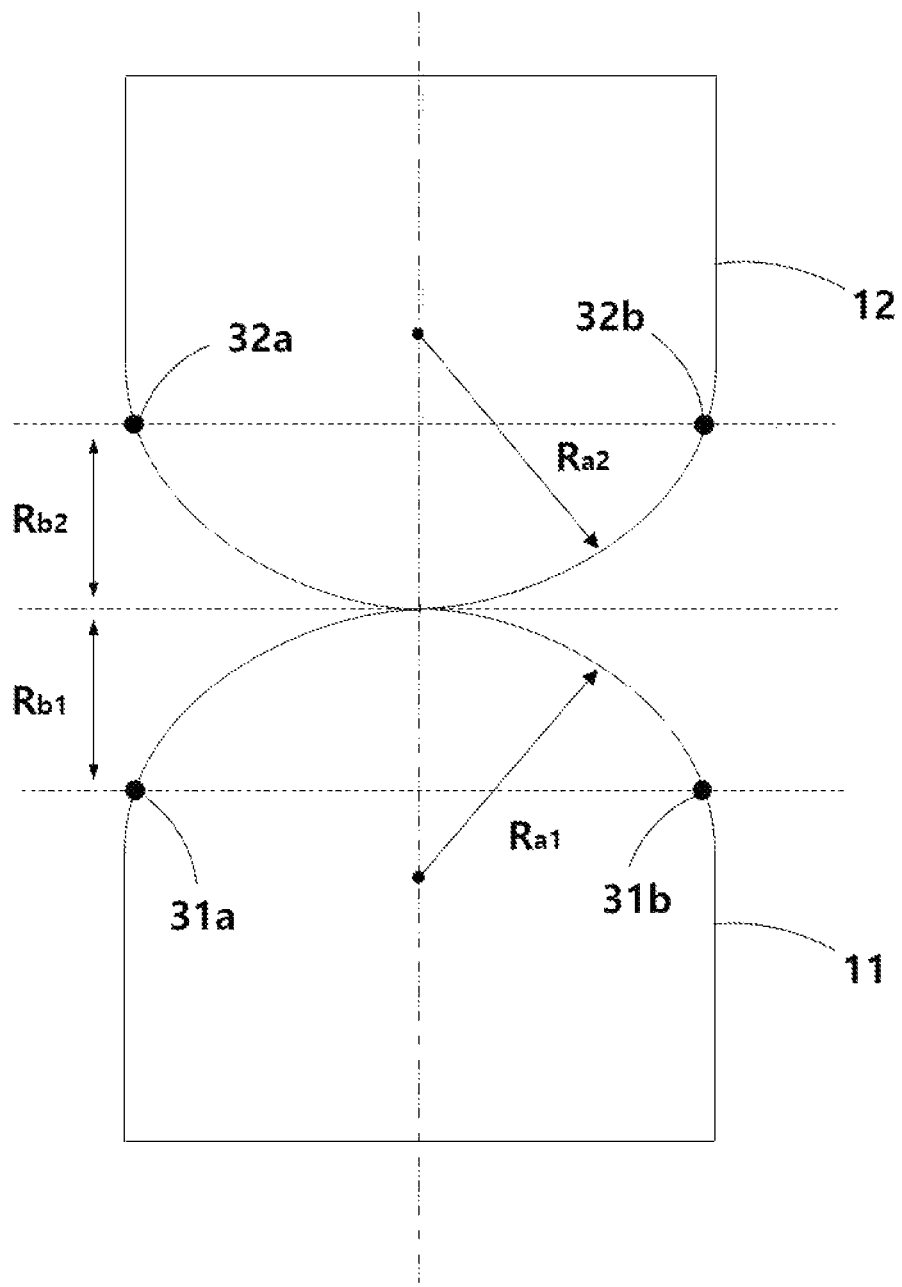
FIG. 1 is a view showing a conventionally symmetric rolling joint.
Figure 2:
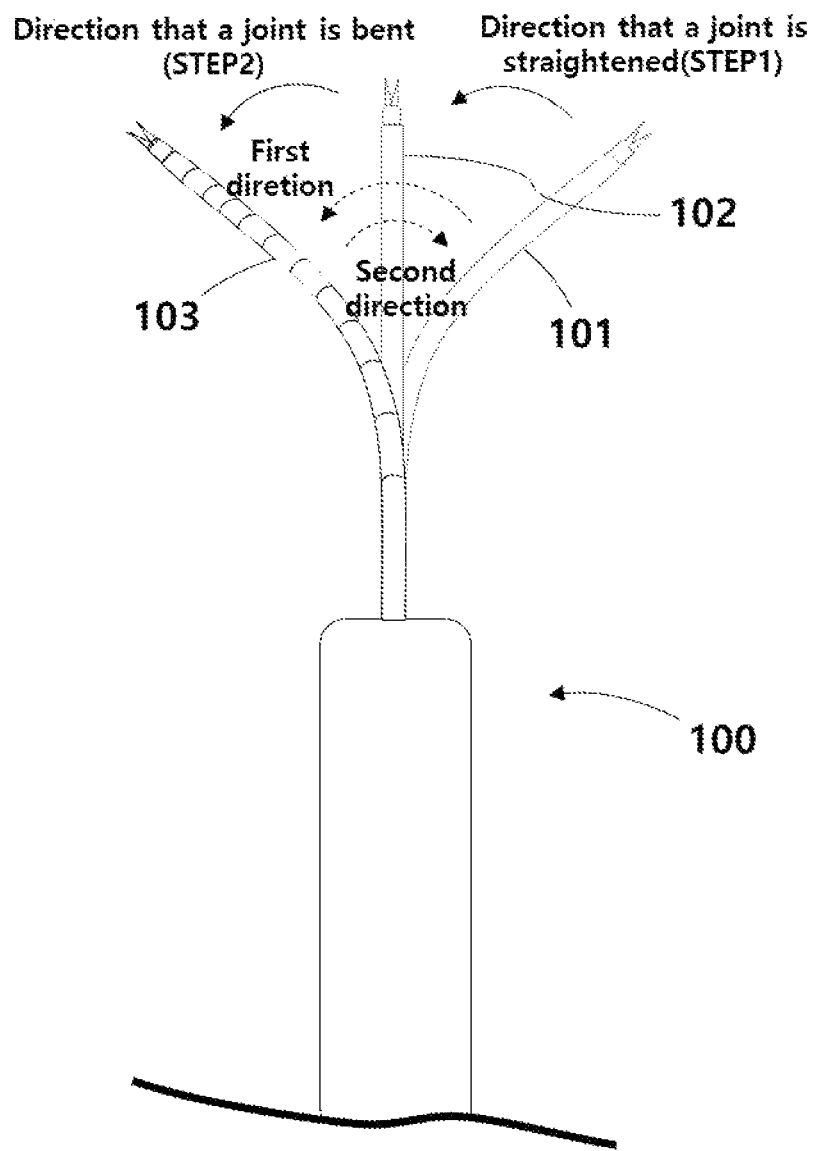
FIG. 2 is a top view showing a direction that a joint of a surgical instrument is straightened and a direction that the joint is bent.
Figure 3:
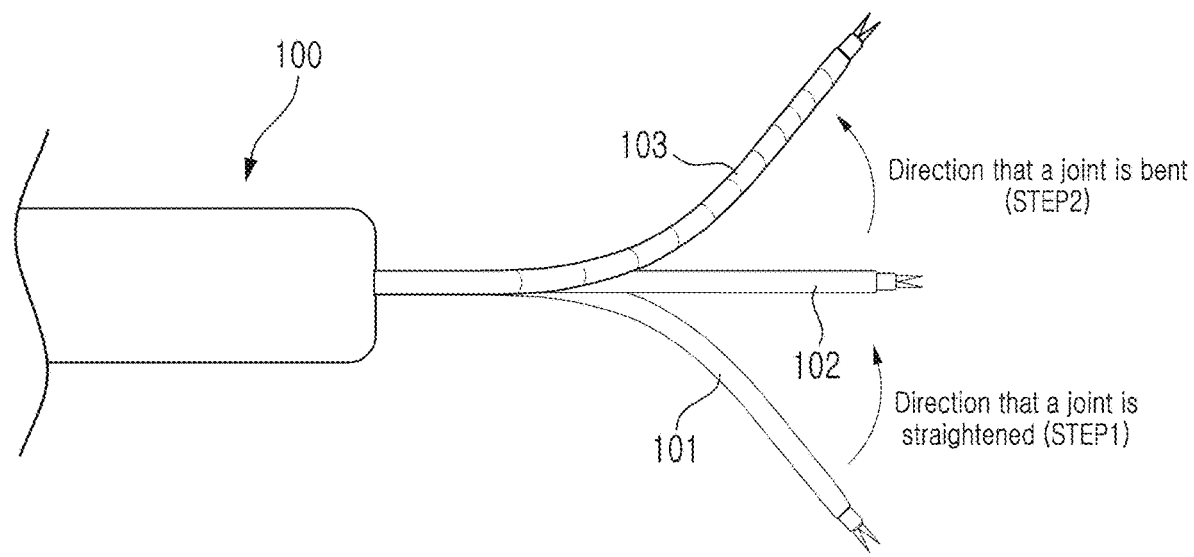
FIG. 3 is a side view showing the direction that the joint of the surgical instrument is straightened and the direction that the joint is bent.

FIGS. 2 and 3 illustrate a surgical instrument 100 having multi-degree of freedom, showing a direction (STEP 1) that a joint is straightened and a direction (STEP 2) that the joint is bent. In this instance, as shown in FIGS. 2 and 3, the surgical instrument 100 having multi-degree of freedom is a device for a relative increase of traction force, an increase of traction force at the time of asymmetry against symmetry, in the first direction from STEP1 to STEP2, but has no regard for a relative increase of traction force in the second direction from STEP2 to STEP1. In order to achieve the relative increase of traction force in the second direction from STEP2 to STEP1, locations of first and second rolling surfaces illustrated in FIGS. 4A-4C are reversed.

Figure 4A:
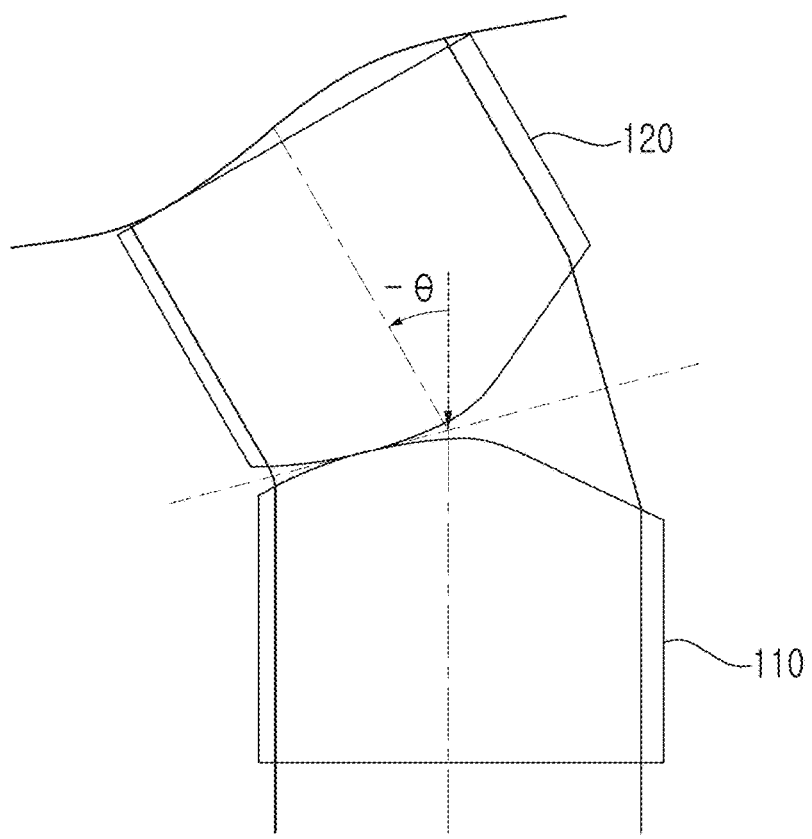
FIGS. 4A-4C are views showing joint links according to a preferred embodiment of the present invention, wherein the direction from FIG. 4A to FIG. 4B shows that the joint is straightened and the direction from FIG. 4B to FIG. 4C shows that the joint is bent.
Figure 4B:
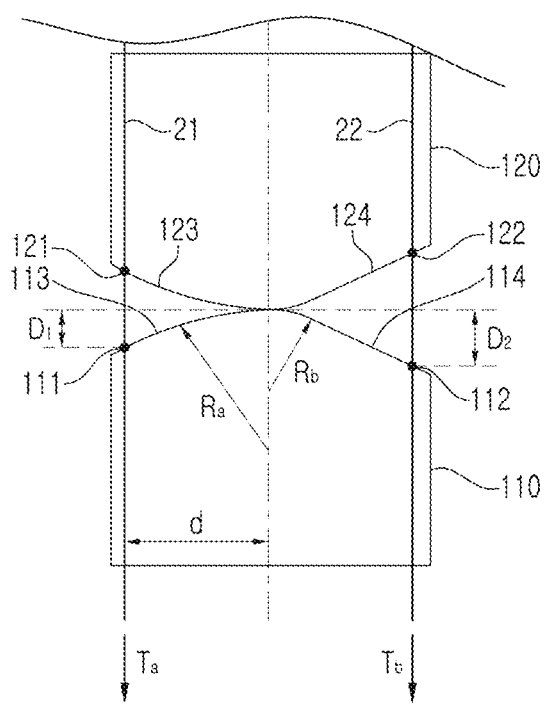
Figure 4C:
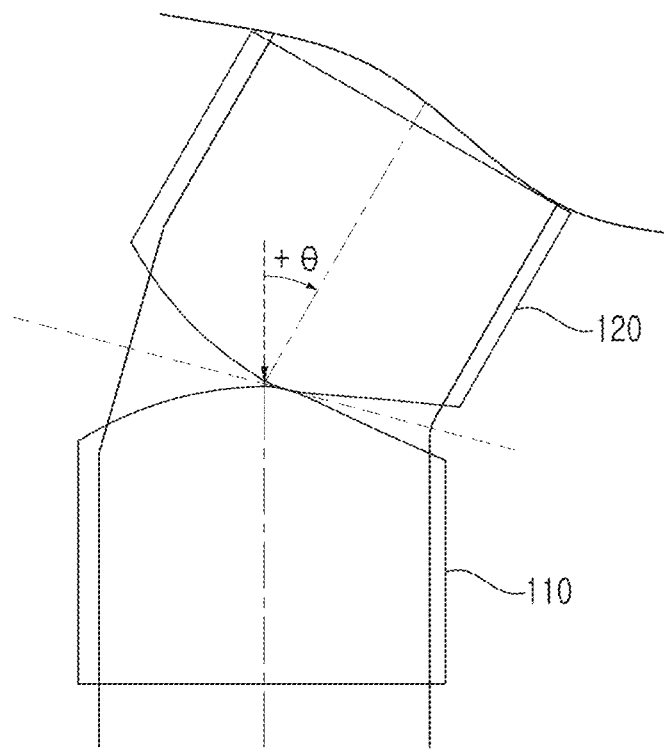

As shown in FIGS.4A-4C, the multi-flexible joint parts 101, 102 and 103 can be controlled multidirectionally according to rolling contact of a first joint link part 110 and a second joint link part 120 and control of the driving wire.

As shown in FIG. 4B, the first joint link part 110 has wire holes 111 and 112 formed at both sides of the joint link part so that a first driving wire 21 and a second driving wire 22 respectively penetrate the wire holes 111 and 112. As shown in FIG. 4B, the second joint link part 120 has wire holes 121 and 122 formed at both sides of the joint link part so that the first driving wire 21 and the second driving wire 22 respectively penetrate the wire holes 121 and 122. Therefore, because the first and second driving wires 21 and 22 are respectively arranged to penetrate through the wire holes 111, 112, 121 and 122, the flexible joint parts 101, 102 and 103 can be controlled multidirectionally according to traction force of the driving wires. The first and second joint link parts 110 and 120 illustrated in FIG. 4B are some of the joint links of the flexible joint parts 101, 102 and 103. So, when the joint link parts are added, such flexible joint parts 101, 102 and 103 illustrated in FIGS. 2 and 3 may be manufactured.

The first and second driving wire holes 111, 112, 121 and 122 are respectively formed on the rolling surfaces. In more detail, the first driving wire hole 111 formed in the first joint link part 110 is formed on the first rolling surface 113 or on a tangent line, and the second driving wire hole 112 is formed on the second rolling surface 114 or on a tangent line. However, various locations that the first and second driving wire holes 111 and 112 will be described later.

Additionally, the first driving wire hole 121 formed in the second joint link part 120 is formed on the first rolling surface 123 or on a tangent line, and the second driving wire hole 122 is formed on the second rolling surface 124 or on a tangent line. However, various locations that the first and second driving wire holes 121 and 122 will be described later.

The first joint link part 110 has a first rolling contact surface which comes in rolling contact with the second joint link part 120. The first rolling contact surface includes a first rolling surface 113 and a second rolling surface 114. For example, the first rolling surface 113 has a radius Ra value, and is formed at the left side on the basis of the central line of FIG. 4B or FIG. 6. The second rolling surface 114 has a radius Rb value, and is formed at the right side on the basis of the central line of FIG. 4B. However, the first and second rolling surfaces 113 and 114 may have a circular form or may have a circular form and a tangent line. Detailed description will be written later.

In addition, the second joint link part 120 includes a second rolling contact surface which comes in rolling contact with the first joint link part 110. The second rolling contact surface includes a first rolling surface 123 and a second rolling surface 124. For example, the first rolling surface 123 has a radius Ra value, and is formed at the left side on the basis of the central line of FIG. 4B. The second rolling surface 124 has a radius Rb value, and is formed at the right side on the basis of the central line of FIG. 4B. However, the first and second rolling surfaces 123 and 124 may have a circular form or may have a circular form and a tangent line. Detailed description of the second rolling contact surface will be substituted with the description of the first rolling contact surface.

Moreover, because the radiuses Ra and Rb of the first rolling surfaces 113 and 123 and the second rolling surface 114 and 124 are different from each other, the rolling surfaces are formed asymmetrically. That is, preferably, the radius Ra value of the first rolling surfaces 113 and 123 is larger than the radius Rb value of the second rolling surfaces 123 and 124. Therefore, virtual lines of the second rolling surfaces 114 and 124 having the radius Rb value are inscribed in virtual lines of the first rolling surfaces 113 and 123. However, even though the virtual lines of the second rolling surfaces 114 and 124 are not inscribed in the virtual lines of the first rolling surfaces 113 and 123, they may be embodied as occasion demands.

Therefore, it is preferable that the first and second rolling contact surfaces of the first joint link part 110 and the second joint link part 120 respectively get in rolling contact with each other, and have symmetric pairs with each other. That is, because the first and second rolling contact surfaces have symmetric pairs with each other, the radius Ra and Rb values are equal to each other, and as described later, it is preferable that the driving wire holes 111 and 112 of the first joint link part and the driving wire holes 121 and 122 of the second joint link part be formed symmetrically.

The first driving wire hole 111 of the first joint link part 110 is formed on the first rolling surface 113. The second driving wire hole 112 of the first joint link part 110 is formed on the second rolling surface 114. The first driving wire hole 111 is a distance $D_1$ away from a virtual horizontal line of the rolling surface, and the second driving wire hole 112 is a distance $D_2$ away from the virtual horizontal line of the rolling surface.

The first driving wire hole 121 and the second driving wire hole 122 of the second joint link part 110 are respectively a distance $D_3$ (not shown in the drawings) and a distance $D_4$ (not shown in the drawings) away in the same principle as the above.

In this instance, in order to form asymmetric rolling surfaces, as shown in FIG. 4B, it is preferable that the distances $D_1$ and $D_3$ are formed shorter than the distances $D_2$ and $D_4$. In this instance, the distances $D_1$ and $D_3$ or the distances $D_2$ and $D_4$ have the same value.

Figure 5A:
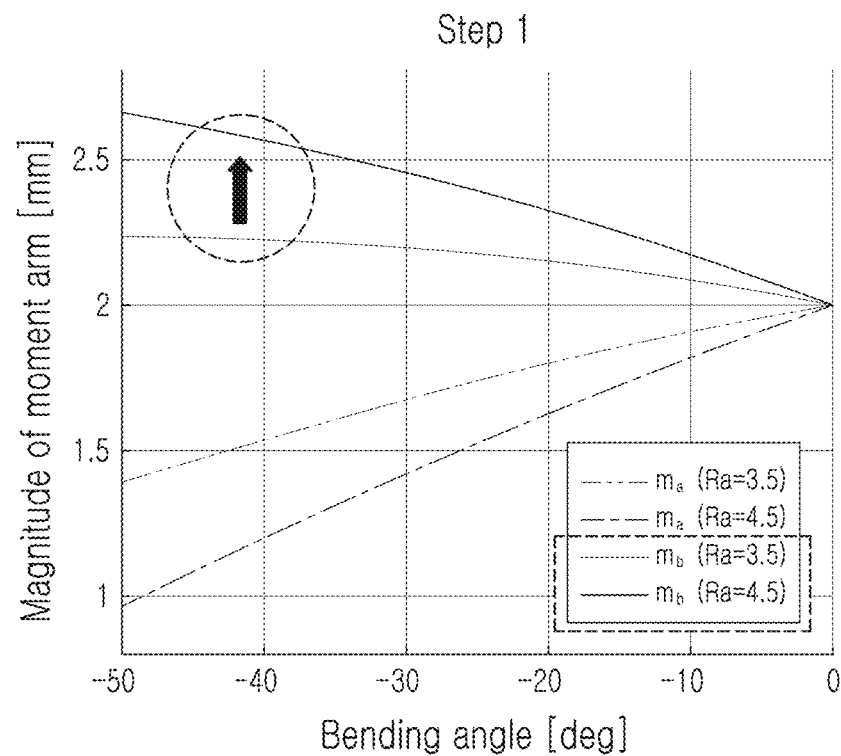
Figure 5B:
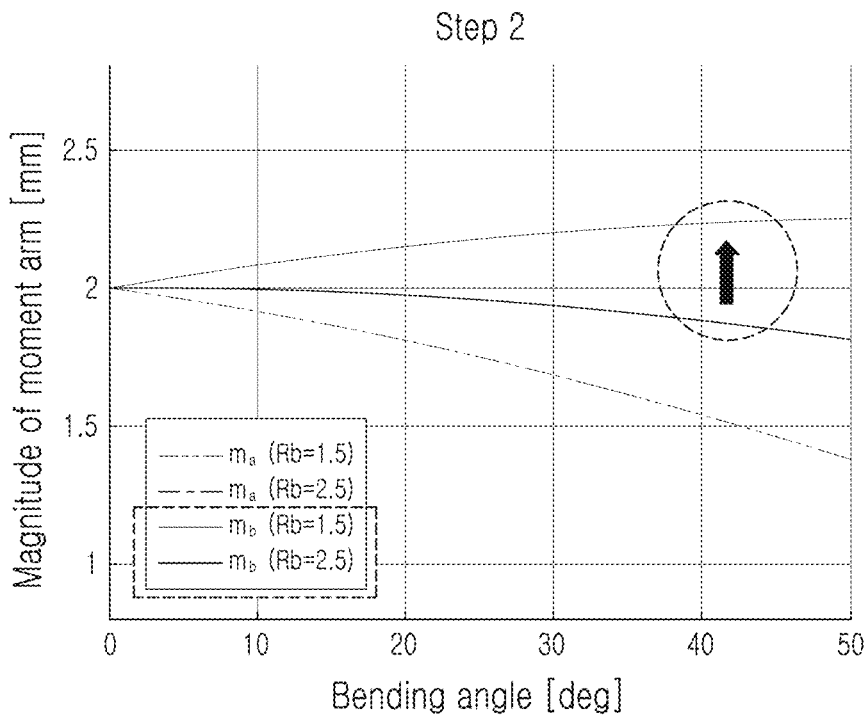

As shown in FIG. 5A, when the radius Ra value is increased from 3.5 to 4.5, a size ($m_b$) of a moment arm which is in proportion to the size of traction force is increased. Furthermore, as shown in FIG. 5B, when the radius Rb value is decreased from 2.5 to 1.5, the size ($m_b$) of the moment arm which is in proportion to the size of traction force is increased.

Hereinafter, formation locations of the rolling surfaces and the driving wire holes will be described according to various embodiments of the present invention. However, in this description, just the rolling surfaces and the wire holes of the first joint link part will be described, and descriptions of the rolling surfaces and the wire holes of the second joint link part will be substituted with the descriptions of the rolling surfaces and the wire holes of the first rolling contact surface.

A first embodiment of the first and second rolling surfaces 113 and 114 and the first and second driving wire holes 111 and 112 will be described.

Figure 6:
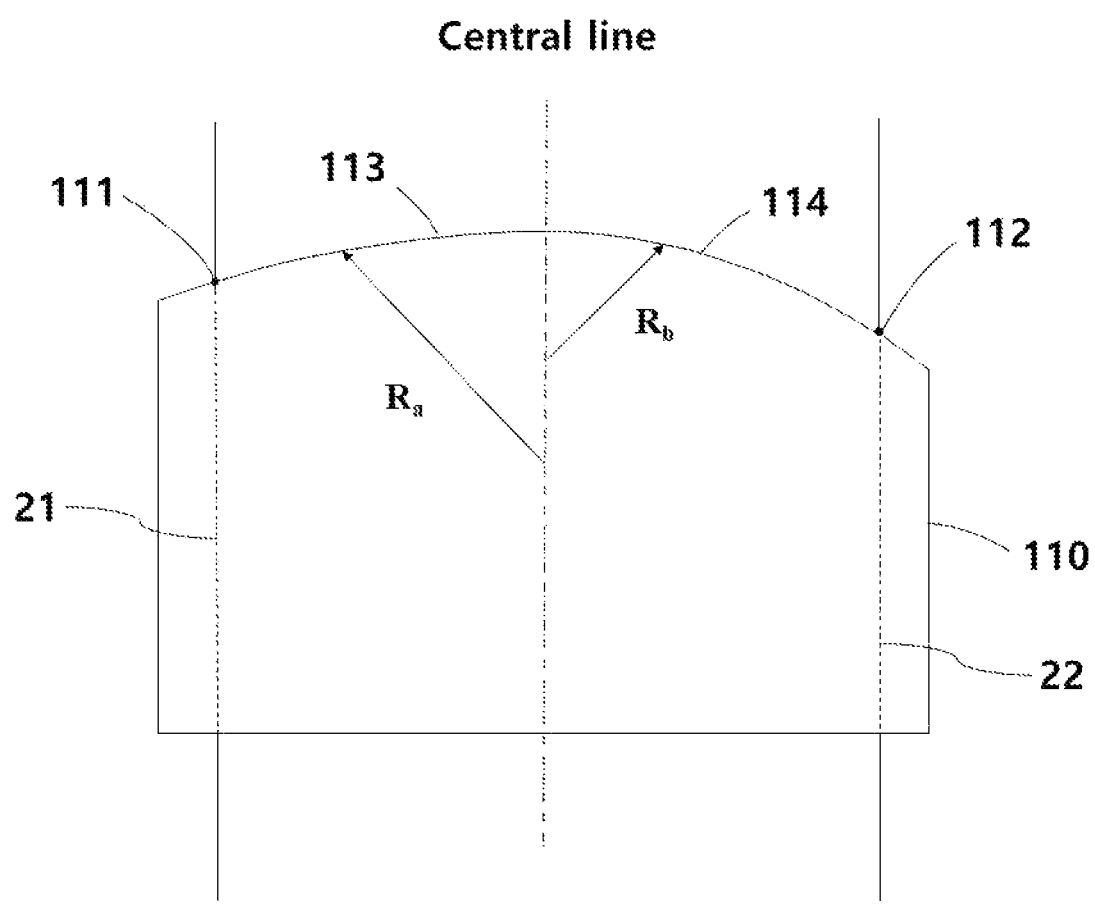
FIG. 6 shows a first embodiment of first and second rolling surfaces 113 and 114 and first and second driving wire through holes 111 and 112 according to the preferred embodiment of the present invention.

As shown in FIG. 6, the first rolling surface 113 and the second rolling surface 113 are respectively parts of circles respectively having a radius Ra and a radius Rb. In this instance, the radius Ra of the first rolling surface and the radius Rb of the second rolling surface are different from each other. That is, the radius Ra of the first rolling surface is larger than the radius Rb of the second rolling surface, so that the rolling surfaces are formed asymmetrically. Additionally, a circle formed on the basis of the radius Rb of the second rolling surface is inscribed in a circle formed on the basis of the radius Ra of the first rolling surface.

In addition, because the first and second driving wire holes 111 and 112 are respectively formed on the first and second rolling surfaces 113 and 114 and a height of the first driving wire hole 111 is relatively lower than a height of the second driving wire hole 112, the rolling surfaces are formed asymmetrically. Referring to FIG. 4B, the heights of the first and second driving wire holes 111 and 112 correspond to the distances $D_1$ and $D_2$.

Now, a second embodiment of the first and second rolling surfaces 113 and 114 and the first and second driving wire holes 111 and 112 will be described.

Figure 7:
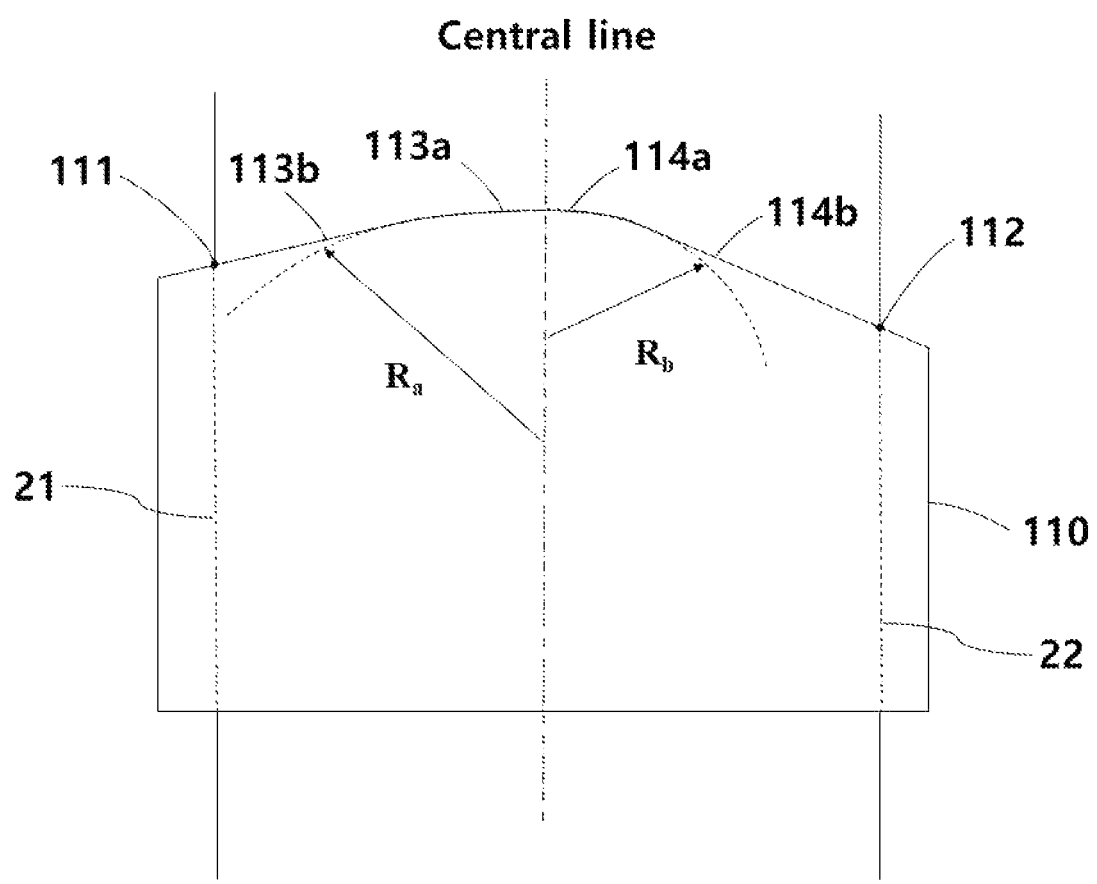
FIG. 7 shows a second embodiment of the first and second rolling surfaces 113 and 114 and the first and second driving wire through holes 111 and 112 according to the preferred embodiment of the present invention.

As shown in FIG. 7, first rolling surfaces 113a and 113b include a circular segment 113a having a first radius Ra and a first tangent line meeting the circular segment 113a having the first radius Ra. Second rolling surfaces 114a and 114b include a circular segment 114a having a second radius Rb and a second tangent line meeting the circular segment 114a having the second radius Rb. The first radius Ra and the second radius Rb have different values, so that rolling contact surfaces are formed asymmetrically. The first radius Ra is relatively larger than the second radius Rb and a slope of the second tangent line 114b is relatively larger than that of the first tangent line 113b, so that rolling surfaces are formed asymmetrically.

Moreover, the first and second driving wire holes 111 and 112 are respectively formed on the first and second tangent lines and the height of the first driving wire hole 111 is relatively lower than that of the second driving wire hole 112, so that the rolling surfaces are formed asymmetrically. Referring to FIG. 4B, the heights of the first and second driving wire holes 111 and 112 correspond to the distances $D_1$ and $D_2$.

Now, a third embodiment of the first and second rolling surfaces 113 and 114 and the first and second driving wire holes 111 and 112 will be described.

Figure 8:
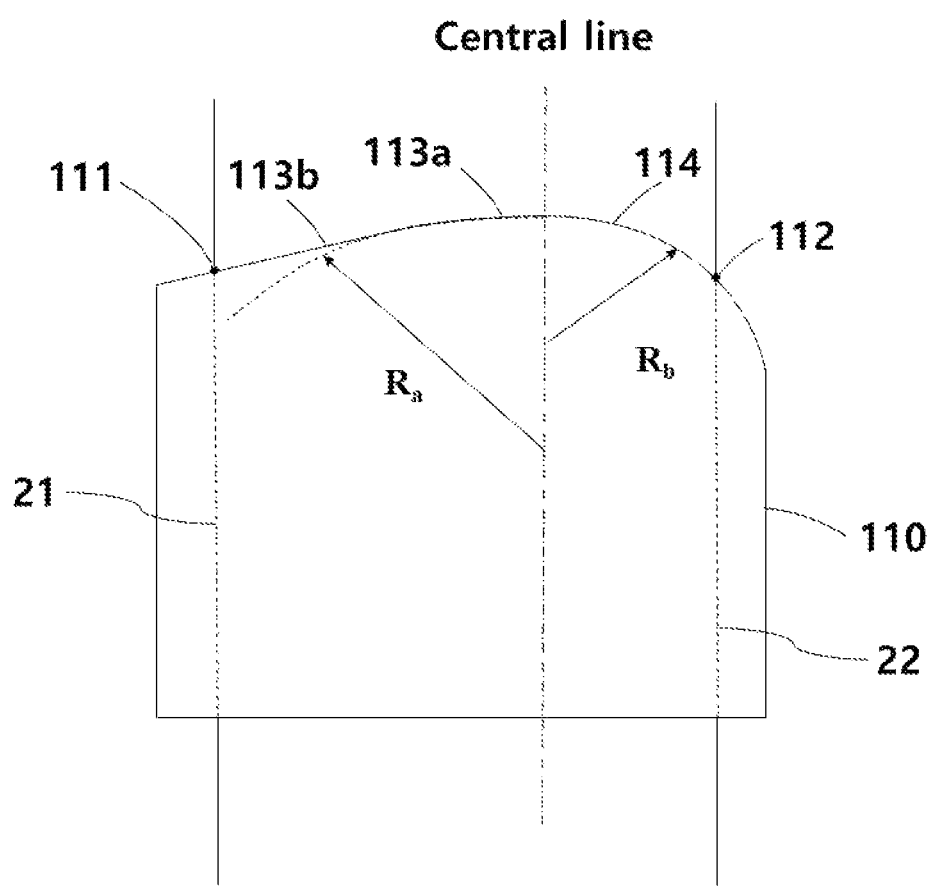
FIG. 8 shows a third embodiment of the first and second rolling surfaces 113 and 114 and the first and second driving wire through holes 111 and 112 according to the preferred embodiment of the present invention.

As shown in FIG. 8, first rolling surfaces 113a and 113b include a circular segment 113a having a first radius Ra and a first tangent line meeting the circular segment 113a having the first radius Ra. A second rolling surface 114 includes a circular segment 114 having a second radius Rb. The first radius Ra and the second radius Rb have different values, so that rolling contact surfaces are formed asymmetrically.

Meanwhile, the first driving wire hole 111 is formed on the tangent line meeting the circular segment having the first radius Ra, and the second driving wire hole 112 is formed on the circular segment 114 having the second radius Rb. The height of the first driving wire hole 111 is relatively lower than that of the second driving wire hole 112, so that the rolling surfaces are formed asymmetrically. Referring to FIG. 4B, the heights of the first and second driving wire holes 111 and 112 correspond to the distances $D_1$ and $D_2$.

Now, a fourth embodiment of the first and second rolling surfaces 113 and 114 and the first and second driving wire holes 111 and 112 will be described.

Figure 9:
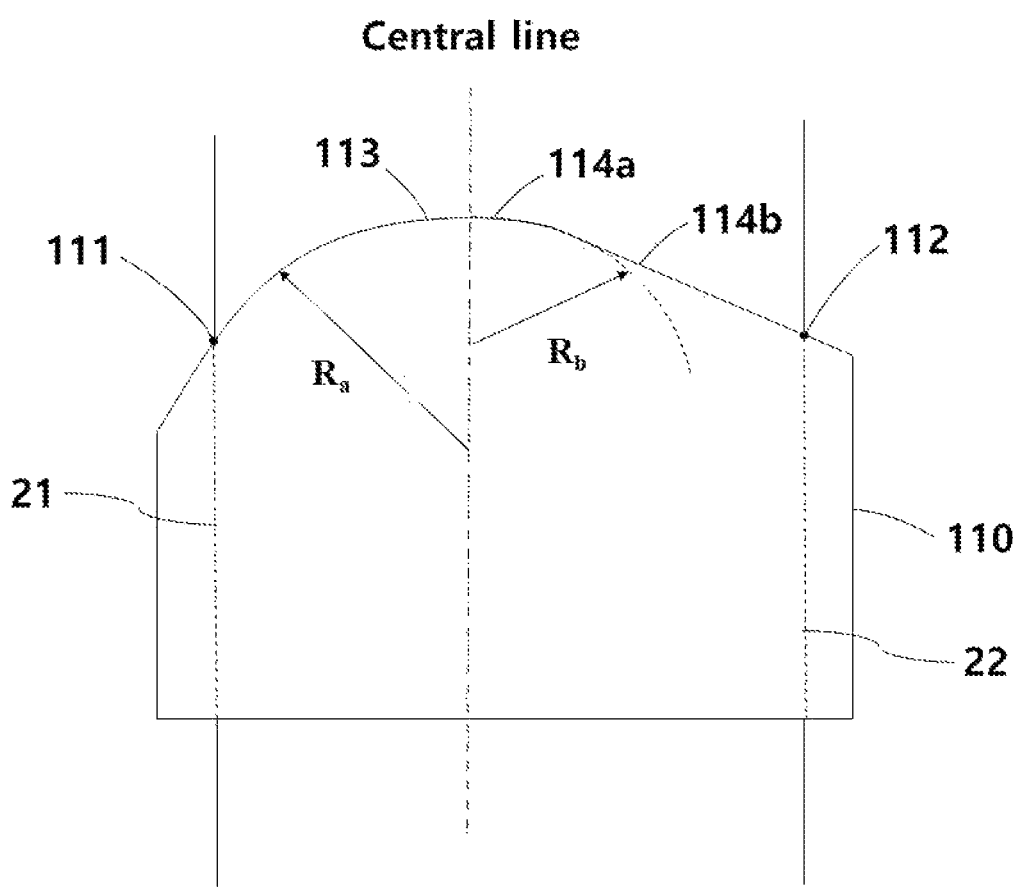
FIG. 9 shows a fourth embodiment of the first and second rolling surfaces 113 and 114 and the first and second driving wire through holes 111 and 112 according to the preferred embodiment of the present invention.

As shown in FIG. 9, a first rolling surface 113 includes a circular segment 113 having a first radius Ra, and second rolling surfaces 114a and 114b include a circular segment 114a having a second radius Rb and a tangent line meeting the circular segment 114a having the second radius Rb. The first radius Ra and the second radius Rb have different values, so that rolling contact surfaces are formed asymmetrically.

Meanwhile, the first driving wire hole 111 is formed on the circular segment 113 having the first radius Ra, and the second driving wire hole 112 is formed on the tangent line meeting the circular segment having the second radius. The height of the first driving wire hole 111 is relatively larger than that of the second driving wire hole 112, so that the rolling surfaces are formed asymmetrically. Referring to FIG. 4B, the heights of the first and second driving wire holes 111 and 112 correspond to the distances $D_1$ and $D_2$.

In the second, third and fourth embodiments, a circle formed on the basis of the second radius Rb is inscribed in a circled formed on the basis of the first radius Ra. Moreover, in the third and fourth embodiments, because the first radius Ra is larger than the second radius Rb, the rolling surfaces are formed asymmetrically.

Descriptions of conventional arts and matters that are obvious to those skilled in the art will be omitted, and explanation or description of such omitted components (methods) and functions may be sufficiently referred without departing from the technical scope and idea of the present invention. Furthermore, the components of the present invention are described for the convenience in explanation of the present invention, and other components which are not described in the present invention may be added without departing from the technical scope and idea of the present invention.

The components and functions of the present invention are individually described for the convenience in explanation of the present invention, and if necessary, any one among the components and functions may be integrated into other components or may be subdivided more.

As described above, while the present invention has been particularly shown and described with reference to the example embodiments thereof, it will be understood by those of ordinary skill in the art that the present invention is not limited to the example embodiments, and various changes, modifications and equivalents may be made in the present invention without departing from the technical scope and idea of the present invention. It would be also understood that when it is judged that detailed descriptions of known functions or structures related with the present invention or combination relations of the structures may make the essential points vague, the detailed descriptions of the known functions or structures will be omitted.

What is claimed is:

1. An asymmetric rolling joint device of a surgical instrument comprising:
   a first joint link part; and
   a second joint link part,
   wherein,
   the first joint link part and the second joint link part are configured to come into rolling contact with each other asymmetrically to form a joint of the surgical instrument,
   the first joint link part comprises:
      a bottom first rolling surface formed at one side on a basis of a first virtual central line of the first joint link part;
      a bottom second rolling surface formed at another side on the basis of the first virtual central line; and
      a bottom first driving wire hole and a bottom second driving wire hole disposed at both sides,
   the second joint link part comprises:
      a top first rolling surface formed at one side on a basis of a second virtual central line of the second joint link part;
      a top second rolling surface at another side on the basis of the second virtual central line; and,
      a top first driving wire hole and a top second driving wire hole disposed at both sides,
   the bottom first rolling surface and the top first rolling surface directly contact at a first rolling contact surface or the bottom second rolling surface and the top second rolling surface directly contact at a second rolling contact surface,
   the bottom first driving wire hole and the top first driving wire hole are configured such that a first driving wire penetrates therethrough,
   the bottom second driving wire hole and the top second driving wire hole are configured such that a second driving wire penetrates therethrough,
   a radius of the top first rolling surface is equal to a radius of the bottom first rolling surface,
   a radius of the top second rolling surface is equal to a radius of the bottom second rolling surface, and
   the radius of the top first rolling surface and the radius of the top second rolling surface have different values such that the first rolling contact surface and the second rolling contact surface are formed asymmetrically, thereby increasing traction force more than when the first rolling contact surface and the second rolling contact surface are formed symmetrically, wherein, the top first rolling surface includes a top first circular segment having a top first radius and a top first tangent line meeting the top first circular segment having the top first radius, the top second rolling surface includes a top second circular segment having a top second radius and a top second tangent line meeting the top second circular segment having the top second radius, the bottom first rolling surface includes a bottom first circular segment having a bottom first radius and a bottom first tangent line meeting the bottom first circular segment having the bottom first radius, the bottom second rolling surface includes a bottom second circular segment having the bottom second radius and a bottom second tangent line meeting the bottom second circular segment having the bottom second radius, and the top first radius and the top second radius have different values, and the bottom first radius and the bottom second radius have different values such that the first rolling contact surface and the second rolling contact surface are formed asymmetrically, the top first driving wire hole and the top second driving wire hole are respectively formed on the top first and the top second tangent lines, and the bottom first driving wire hole and the bottom second driving wire hole are respectively formed on the bottom first and the bottom second tangent lines, the height of the top first driving wire hole is lower than that of the top second driving wire hole, and the height of the bottom first driving wire hole is lower than that of the bottom second driving wire hole such that the first rolling contact surface and the second rolling contact surface are formed asymmetrically.

2. The asymmetric rolling joint device according to claim 1, wherein a height of the top first driving wire hole and a height of the top second driving wire hole are different, and a height of the bottom first driving wire hole and a height of the bottom second driving wire hole are different such that the first rolling contact surface and the second rolling contact surface are formed asymmetrically in order to increase traction force.

3. The asymmetric rolling joint device according to claim 2, wherein, the height of the top first driving wire hole is lower than the height of the top second driving wire hole, and the height of the bottom first driving wire hole is lower than the height of the bottom second driving wire hole such that the first rolling contact surface and the second rolling contact surface are formed asymmetrically.

4. The asymmetric rolling joint device according to claim 1, wherein the radius of the top first rolling surface is larger than the radius of the top second rolling surface such that the first rolling contact surface and the second rolling contact surface are formed asymmetrically.

5. The asymmetric rolling joint device according to claim 1, wherein a circle formed on a basis of the radius of the top second rolling surface is inscribed in a circle formed on a basis of the radius of the top first rolling surface.

6. The asymmetric rolling joint device according to claim 1, wherein, the top first radius is larger than the top second radius, the bottom first radius is larger than the bottom second radius, a slope of the bottom second tangent line is larger than that of the bottom first tangent line, and a slope of the top second tangent line is larger than that of the top first tangent line such that the first rolling contact surface and the second rolling contact surface are formed asymmetrically.

7. The asymmetric rolling joint device according to claim 1, wherein, the top first rolling surface includes a top circular segment having a top first radius and a top first tangent line meeting the top first circular segment having the top first radius, the top second rolling surface includes a top second circular segment having a top second radius, the bottom first rolling surface includes a bottom first circular segment having a bottom first radius and a bottom first tangent line meeting the bottom first circular segment having the bottom first radius, the bottom second rolling surface includes a bottom second circular segment having the bottom second radius, and the top first radius and the top second radius have different values, and the bottom first radius and the bottom second radius have different values such that the first rolling contact surface and the second rolling contact surface are formed asymmetrically.

8. The asymmetric rolling joint device according to claim 7, wherein, the top first driving wire hole and the bottom first driving wire hole are formed on the top first tangent lineand the bottom first tangent line, respectively, the top second driving wire hole and the bottom second driving wire hole are formed on the top second circular segment and the bottom second circular segment, respectively, and the height of the top first driving wire hole is lower than that of the top second driving wire hole, and the height of the bottom first driving wire hole is lower than that of the bottom second driving wire hole such that the first rolling contact surface and the second rolling contact surface are formed asymmetrically.

9. The asymmetric rolling joint device according to claim 7, wherein the top first radius is larger than the top second radius, and the bottom first radius is larger than the bottom second radius such that the first rolling contact surface and the second rolling contact surface are formed asymmetrically.

10. The asymmetric rolling joint device according to claim 7, wherein a circle formed on a basis of the top second radius is inscribed in a circle formed on a basis of the top first radius, and a circle formed on a basis of the bottom second radius is inscribed in a circle formed on a basis of the bottom first radius.

11. The asymmetric rolling joint device according to claim 1,
wherein,
the top first rolling surface includes a top first circular segment having a top first radius,
the top second rolling surface includes a topte second circular segment having a top second radius and a top second tangent line meeting the top second circular segment having the top second radius,
the bottom first rolling surface includes a bottom first circular segment having the bottom first radius,
the bottom second rolling surface includes a bottom second circular segment having the bottom second radius and a bottom second tangent line meeting the bottom second circular segment having the bottom second radius, and
the top first radius and the top second radius have different values and the bottom first radius and the bottom second radius have different values such that the first rolling contact surface and the second rolling contact surface are formed asymmetrically.

12. The asymmetric rolling joint device according to claim 11,
wherein,
the top first driving wire hole and the bottom first driving wire hole are formed on the top first circular segment and the bottom first circular segment, respectively,
the top second driving wire hole and the bottom second driving wire hole are formed on the top second tangent line and the bottom second tangent line, respectively, and
the height of the top first driving wire hole is larger than that of the top second driving wire hole, and the height of the bottom first driving wire hole is larger than that of the bottom second driving wire hole such that the first rolling contact surface and the second rolling contact surface are formed asymmetrically.

13. The asymmetric rolling joint device according to claim 11,
wherein a circle formed on a basis of the top second radius is inscribed in a circle formed on the basis of the top first radius, and
a circle formed on a basis of the bottom second radius is inscribed in a circle formed on the basis of the bottom first radius.

14. The asymmetric rolling joint device according to claim 11,
wherein the top first radius is larger than the top second radius, and the bottom first radius is larger than the bottom second radius such that the first rolling contact surface and the second rolling contact surface are formed asymmetrically.

15. The asymmetric rolling joint device according to claim 1,
wherein a circle formed on a basis of the top second radius is inscribed in a circle formed on a basis of the top first radius, and
a circle formed on a basis of the bottom second radius is inscribed in a circle formed on a basis of the bottom first radius.

* * * * *